A magnetic disk can be magnetized simply and in a short time. A magnetic disk producing method produces a magnetic disk having a central hole, an outer radius, a plurality of annular recording tracks formed in a direction from the central hole toward the outer radius, each recording track including a plurality of sectors, and a recess formed between adjacent recording tracks to a predetermined depth. The method includes providing a magnetizing master disk magnetized in a predetermined pattern of alternating N and S polarities extending in a direction from a center of the master disk toward an outer radius thereof; and superposing the master disk on the magnetic disk to magnetically transcribe a magnetic signal to the recording tracks based on the predetermined pattern.

(12) United States Patent
Nakao (10) Patent No.: US 7,471,478 B2
(45) Date of Patent: Dec. 30, 2008

(54) MAGNETIC DISK PRODUCING METHOD (75) Inventor: Shinichi Nakao, Kanagawa (JP)

(73) Assignee: Sony Corporation (JP)

( * ) Notice: Subject to any disclaimer, the term of this patent is extended or adjusted under 35 U.S.C. 154(b) by 223 days.

(21) Appl. No.: 11/355,460

(22) Filed: Feb. 16, 2006

(65) Prior Publication Data
US 2006/0203365 A1 Sep. 14, 2006

(30) Foreign Application Priority Data
Feb. 18, 2005 (JP) ............... 2005-042910

(51) Int. Cl.
G11B 5/86 (2006.01)

(52) U.S. Cl. ...................................... 360/16
(58) Field of Classification Search ............... None
See application file for complete search history.

(56) References Cited

U.S. PATENT DOCUMENTS

2003/0034862 A1* 2/2003 Nishikawa et al. .......... 335/106
2005/0219730 A1* 10/2005 Sakurai et al. ............... 360/48

FOREIGN PATENT DOCUMENTS

JP 2863190 B2 10/1990

* cited by examiner

Primary Examiner—Fred F. Tzeng
Assistant Examiner—Daniell L Negrón
(74) Attorney, Agent, or Firm—Lerner, David, Littenberg, Krumholz & Mentlik, LLP (57) ABSTRACT 2 Claims, 7 Drawing Sheets

MAGNETIC DISK PRODUCING METHOD

CROSS-REFERENCE TO RELATED APPLICATIONS

The present application claims priority from Japanese Patent Application No. JP 2005-042910 filed on Feb. 18, 2005, the disclosure of which is hereby incorporated by reference herein.

BACKGROUND OF THE INVENTION

The present invention relates to a method of producing a magnetic disk through magnetic transcription of a magnetic signal.

The magnetic recording/reproducing apparatus has so far been required to have an increased recording capacity. The current tendency of this field is to design a magnetic recording/reproducing apparatus capable of recording data with a higher density. As the typical magnetic storage unit, hard disk drives of more than 1 Gbits/in$^2$ in surface recording density have already been produced on a commercial basis.

Note that the hard disk is a horizontally flat disk having recording tracks formed concentrically in a direction from the central hole toward the outer radius and of which adjacent ones form together a zone in which they are not physically independent of each other but contiguous to each other. In such a hard disk, the radial density of the recording tracks, that is, the track pitch, influences the signal-to-noise ratio (S/N ratio) of the reproduced signal because of the problems which will be explained below.

1. Record Head Width Ww in Disk-radial Direction

When data is recorded by a record head, the larger the width Ww of the record head, the wider the recording mark will be formed. Also, the fringe field of the record head causes fringing in the radial direction of the hard disk so that the recording mark will actually have a width larger than Ww. Therefore, the width of the recording mark includes a part (as wide as the record head) formed by the record head and a part formed due to the fringing. No correct reproduced signal can be obtained from the part formed due to the fringing.

Therefore, when the record head width Ww is as large as the recording track width W, an extra signal will be recorded to adjacent recording tracks and the fringing spread to the recording marks formed on the tracks. If the fringing has thus spread to the recording marks, the S/N ratio of the reproduced signal will be deteriorated when the read head detects the fringe field. Therefore, the record head width Ww should be smaller than the recording track width W (Ww<W).

2. Read Head Width Wr in Disk-radial Direction

On the other hand, to obtain a high-sensitivity reproduced signal from the fringe field of the recording mark, it is necessary to detect no fringe field from the part formed due to the fringing at the time of recording and design the read head width Wr equal to or smaller than the recording mark width. Especially, the read head should be designed to have a width which can cope with the fact that the center of the recording track cannot always be traced because of a servo deviation occurring during data reading. On the other hand, the smaller the read head width Wr, the smaller the obtainable reproduced signal will be. So, the read head width Wr may not be designed smaller because the reproduced signal will have S/N ratio accordingly deteriorated.

Therefore, as will be seen from the description of the problems 1 and 2, the relation among the read head width Wr, record head width Ww and recording track width W will be as follows:

Wr<Ww<W

So, a recording mark cannot be formed over the recording track width W while reading cannot be made from a formed recording mark as a whole.

On this account, a technique called "DTR (Discrete Track Recording)" has been proposed for a higher density of data recording to a hard disk. The DTR technique is to solve the aforementioned problems of the recording track pitch. More particularly, in a hard disk, adjacent recording tracks are made independent of each other by forming, between them, a physical recess to such a depth and shape that the fringe field from the recess will not reach the read head or that the read head will not detect the fringe field.

In the hard disk having the recess formed between adjacent recording tracks with the DTR technique, since no consideration may be given to the fringing, so the record head width Ww may be designed larger than the recording track (land) width W and the recording mark may be formed over the land width. Thus, the above problem 1 can be solved. Also, since no consideration may be given to the part formed due to the fringing, the read head width Wr may be designed larger than the land width W. Even with a servo deviation, reading can be made from over the land width W. Thus, the above problem 2 can be solved.

That is to say, the readable recording mark width depends upon the land (recording mark) width W, and the DTR technique is not used. Namely, since the recording mark can be formed wider than the recording mark formed in a hard disk having no recess formed between adjacent recording tracks, so the S/N ratio can be increased in relation to the recording track pitch.

Note here that the hard disk is formed from a magnetic material and information such as servo information is also recorded with magnetic signals of S and N polarities. In the past, a servo signal and disk position signal have been recorded with a jig or the like before the hard disk is assembled into each hard disk drive.

In a hard disk adopting the DTR technique, since the recording tracks are formed as convexities when the hard disk is being produced, so it is necessary to record servo information along the recording tracks. To this end, in Japanese Patent No. 2863190, the Applicant of the present invention proposed a method of recording a servo signal by recording a repetition signal to a hard disk through magnetization with an external alternating magnetic field.

With the improvement in recording density of the hard disk, however, the frequency of the necessary repetition signal is higher, which will cause an external alternating magnetic field. For example, in case the electromagnet is driven with an alternating current, it is difficult to drive the electromagnet proportionally to a higher driving frequency.

Also, in a normal hard disk other than the hard disk produced with the DTR technique, servo information, address information and the like have to be recorded to each recording track, which will take much time.

SUMMARY OF THE INVENTION

It is therefore desirable to overcome the above-mentioned drawbacks of the related art by providing a method of producing a magnetic disk having a recess formed between adjacent recording tracks with the DTR technique by recording servo information in a short time without using an external alternating magnetic field.

According to the present invention, there is provided a method of producing a magnetic disk having a central hole, an outer radius, a plurality of annular recording tracks formed in a direction from the central hole toward the outer radius, each recording track including a plurality of sectors, and a recess formed between adjacent recording tracks to a predetermined depth. The method includes providing a magnetizing master disk magnetized in a predetermined pattern of alternating N and S polarities extending in a direction from a center of the magnetic disk toward an outer radius thereof; and superposing the master disk on the magnetic disk to magnetically transcribe a magnetic signal to the recording tracks based on the predetermined pattern.

According to the present invention, a servo signal, clock information, etc. can be recorded to the magnetic disk having the recess formed thereon between the adjacent recording tracks simply and in a short time without using any electromagnet and special overwrite head.

DETAILED DESCRIPTION

The present invention will be described in detail below concerning the embodiments thereof with reference to the accompanying drawings.

Figure 1:
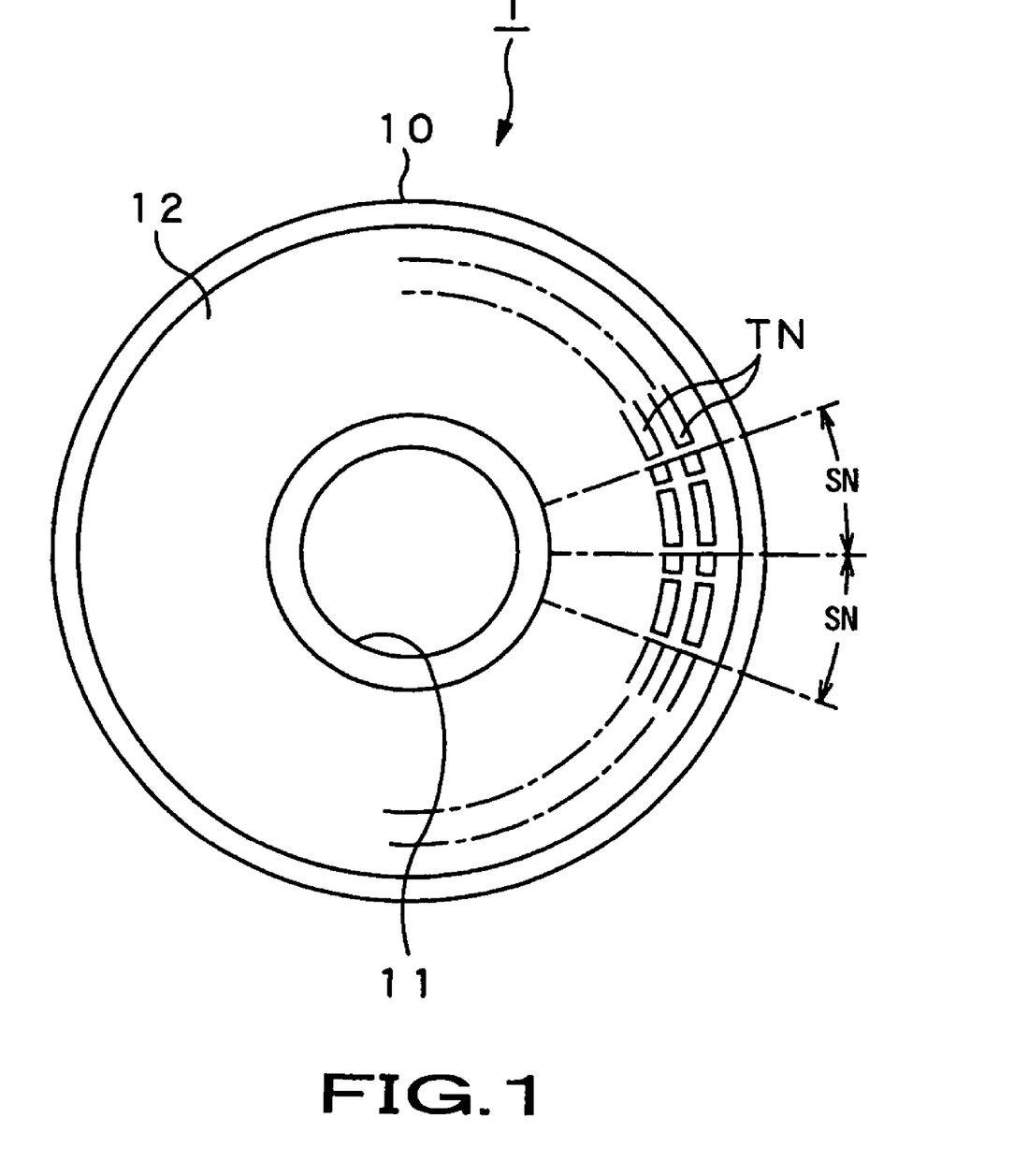
FIG. 1 schematically illustrates a magnetic disk as an embodiment of the present invention.

Referring now to FIG. 1, there is schematically illustrated a magnetic disk produced as an embodiment of the present invention by a magnetic disk producing method which is also an embodiment of the present invention. The magnetic disk is generally indicated with a reference numeral 1. According to this embodiment, the magnetic disk 1 includes a substrate 10 formed from aluminum to have a disk-like shape, for example. The substrate 10 has formed therein a central hole 11 around which there is provided a magnetic layer as a recording region 12. In the recording region 12, information/data is recorded to a plurality of recording tracks TN formed concentrically around the central hole 11 to provide tracking servo control information when the magnetic disk 1 is played. It should be noted that record of information/data to the recording track TN will be described in detail later.

Figure 2:
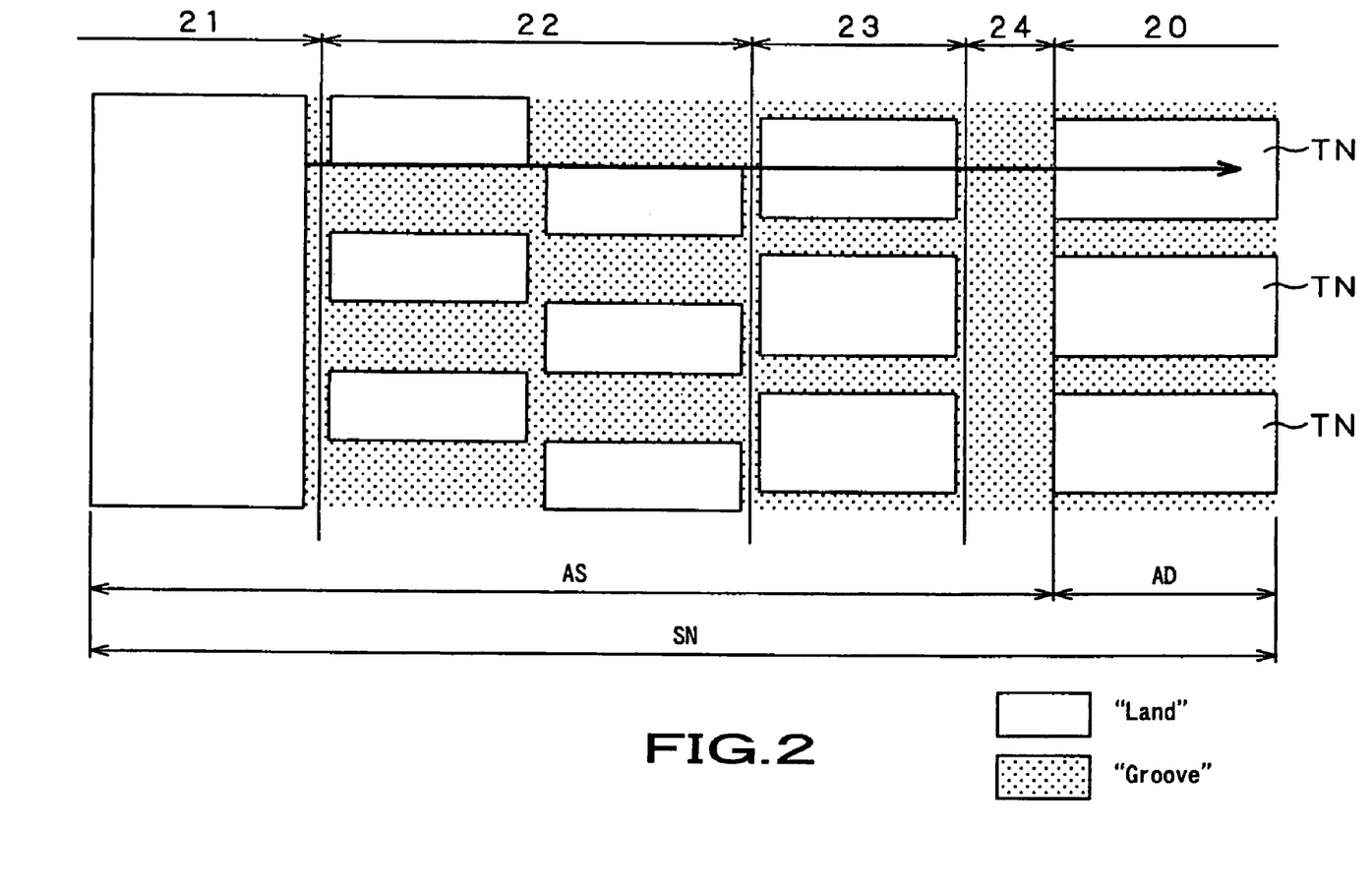
FIG. 2 is an illustration, enlarged in scale, of a part of the magnetic disk shown in FIG. 1.

Each of sectors SN included in each of the recording tracks TN includes a recording pattern consisting of control information recording areas AS and data/information recording areas AD as shown in FIG. 2. Each of the data/information recording areas AD includes a partitioned data/information area 20 formed from flat truncated convexities (will be referred to as "land" hereunder) each extending along the recording tracks TN, projecting vertically from a hatched surface and having a magnetic layer provided thereon. Each of the control information recording areas AS includes an address /ID area 21 formed from a land extending perpendicularly to the recording tracks TN, projecting vertically from the hatched surface and having a magnetic layer provided thereon, and to which address information etc. are to be recorded, PES (Position Error Signal) area 22 formed from lands each extending along the recording tracks TN, projecting vertically from the hatched surface, and having a magnetic layer provided thereon, and to which a servo signal used to make tracking of a record/read head is to be recorded, and a clock area 23 formed from lands each extending along the recording tracks TN, projecting vertically from the hatched surface and having a magnetic layer provided thereon, and to which a fixed-period clock signal is to be recorded. The control information recording area AS also includes a unique pattern area 24 formed as a concavity (will be referred to as "groove" hereunder).

In the magnetic disk designed as above, each of the plurality of recording tracks TN concentrically formed in the recording region 12 will be formed to include a data/information recording section formed from the plurality of partitioned data/information areas 20 isolated from each other by the control information recording area AS in each sector SN and surrounding the central hole 11, and the address/ID area 21, PES area 22 and clock area 23 disposed in a predetermined pattern in each control information recording area AS as an area to isolate the data/information recording sections from each other.

The magnetic layer formed in each partitioned data/information area 20 and those formed in each of the address/ID area 21, PES area 22 and clock area 23 will have a common signal recorded therein, that is, will be magnetized with the same signal or will have the same signal recorded therein, respectively.

Figure 3:
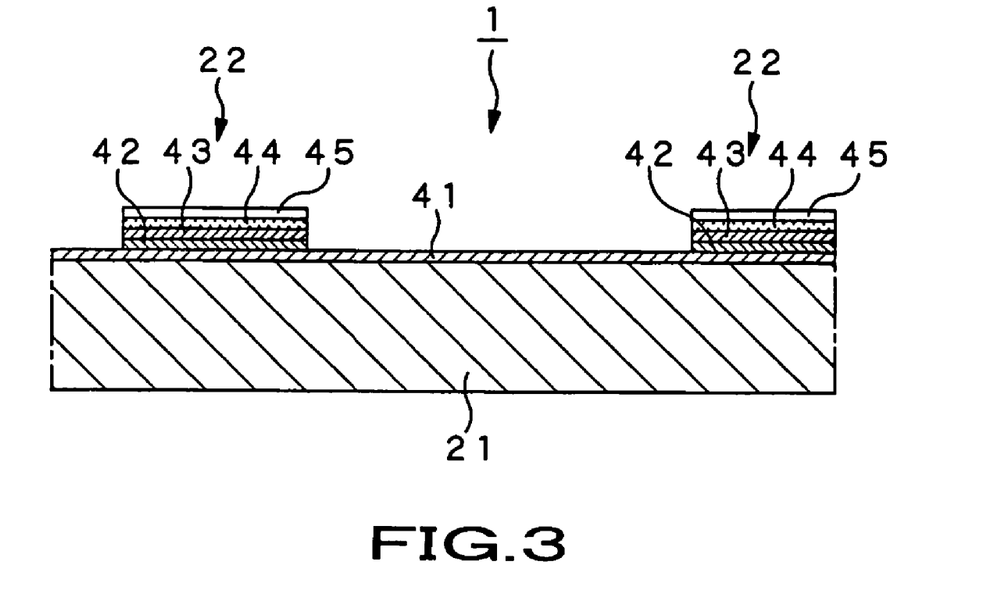
FIG. 3 is a first sectional view, enlarged in scale, of a substantial part of the magnetic disk shown in FIG. 2.

The substantial part, including the PES area 22, of the magnetic disk 1 produced by the aforementioned method will be explained in detail hereinbelow with reference to FIG. 3. As shown in FIG. 3, over the surface of the recording area 12 of the substrate 10, there is provided a nickel-phosphor layer 41 on which there are locally provided zones in each of which a chrome layer 42, magnetic layer 43, protective layer 44 formed from carbon etc. and a lubricant layer 45 are stacked on one another to thereby form the PES area 22.

The partitioned data/information area 20, address/ID area 21, PES area 22 and clock area 23 are formed by sequentially stacking the nickel-phosphor layer 41, chrome layer 42, magnetic layer 43, protective layer 44 and lubricant layer 45 over, for example, a surface portion of the substrate 10 which is to be the recording region 12, to form a laminated structure, then etching the laminated structure which is masked corresponding to shapes of portions where the partitioned data/information area 20, address/ID area 21, PES area 22 and clock area 23 are to be formed, removing the portions other than the masked portions for the chrome layer 42, magnetic layer 43, protective layer 44 and lubricant layer 45, and then unmasking the laminated structure.

Figure 4:
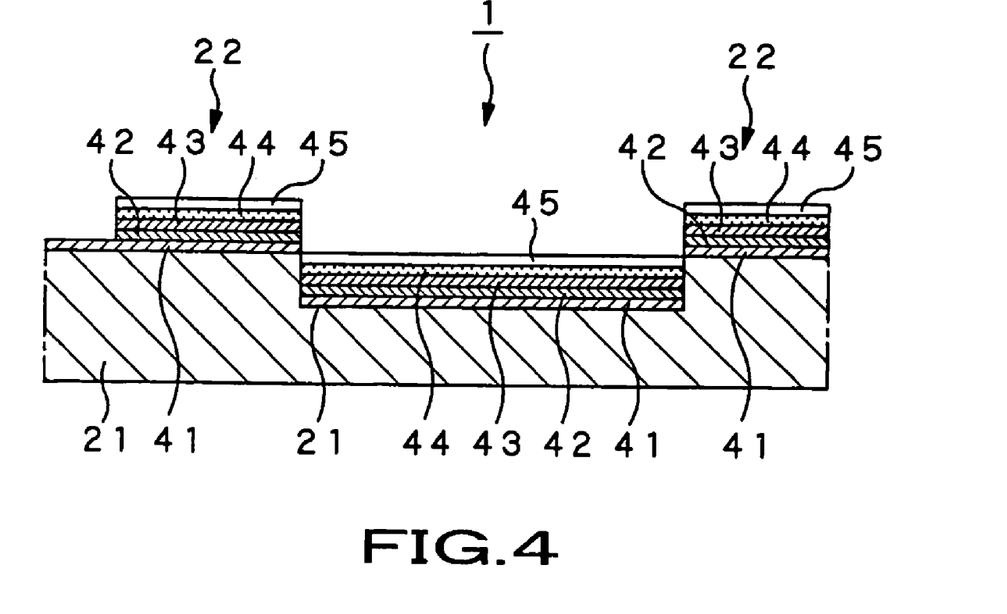
FIG. 4 is a second sectional view, enlarged in scale, of the substantial part of the magnetic disk shown in FIG. 2.

FIG. 4 shows in detail another example of the substantial part, including the PES area 22, of the magnetic disk 1. In this example, in a portion of the substrate 10 which is to be the recording region 12, a concavity 21' is formed around a location where the PES area 22 is to be formed, resulting in upward projection, in relation to the concavity 21', of the portion where the PES area 22 is to be formed. In the portion of the substrate 10 which is to be the recording region 12 and in which the concavity 21' is formed, for example, a nickel-phosphor layer 41, chrome layer 42, magnetic layer 43, protective layer 44 formed from carbon, etc. and lubricant layer 45 are stacked on one another to form, at the location where the PES area 22 is to be formed, a laminated structure including the nickel-phosphor layer 41, chrome layer 42, magnetic layer 43, protective layer 44 and lubricant layer 45. Thus, the PES area 22 is formed.

The partitioned data/information area 20, address/ID area 21, PES area 22 and clock area 23 are formed by etching a portion of substrate 10 which is to be the recording region 12, for example, with that portion being masked corresponding to shapes of portions where the partitioned data/information area 20, address/ID area 21, PES area 22 and clock area 23 are to be formed, to form the concavity 21' at a portion other than the masked portions, unmasking the laminated structure and then stacking the nickel-phosphor layer 41, chrome layer 42, magnetic layer 43, protective layer 44 and lubricant layer 45 on one another over the portion of substrate 10, which is to be the recording region 12, and in which the concavity 21' is formed therein, to form a laminated structure.

Here will be described how to record information/data to the recording tracks.

The Applicant of the present invention proposed, in Japanese Patent No. 2863190, that servo information and clock information are recorded to the magnetic disk 1 having a recess formed between adjacent recording tracks and whose recording area is formed from lands and grooves by magnetizing the magnetic disk with a predetermined frequency by various methods.

Note here that the frequency of an external alternating magnetic field required for magnetizing the magnetic disk 1 depends upon the recording density. With the recent improvement of the recording density, there has been required a higher frequency for the external alternating magnetic field. To generate an external alternating magnetic field using an electromagnet, for example, the electromagnet is to be driven with an alternating current. However, when the driving frequency is higher than a specific one, it is difficult to generate an alternating magnetic field.

On this account, the present invention proposes to magnetically transcribe a servo signal and clock information to the magnetic disk 1 from a master disk 2 as will be described below.

Figure 5:
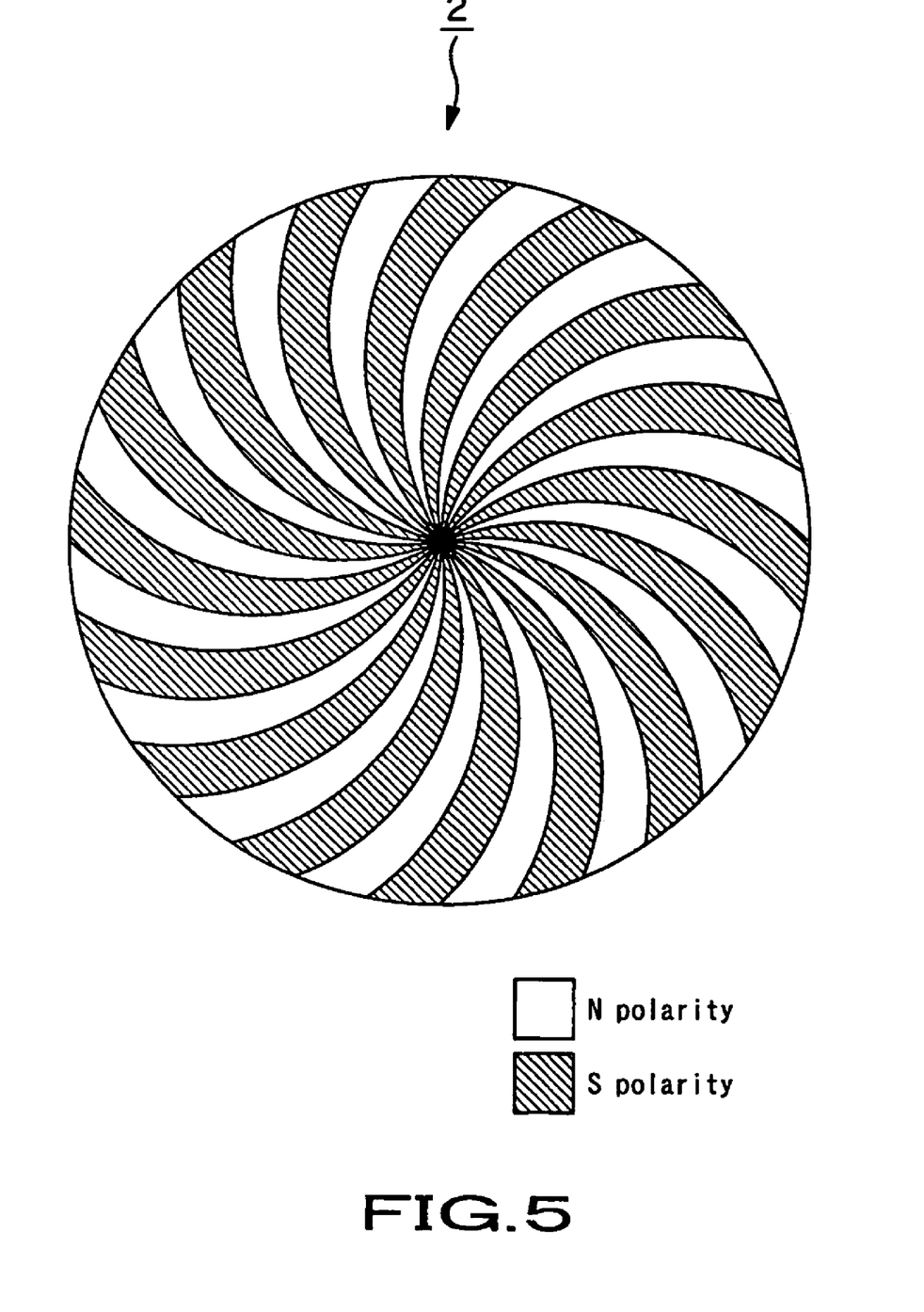
FIG. 5 is a schematic illustration of a master disk used in the present invention.

As shown in FIG. 5, the master disk 2 is magnetized in a predetermined pattern of N and S polarities alternating with each other in a direction from the center toward outer radius. It should be noted that the N/S-polarity pattern formed on the master disk 2 is formed according to a pattern depicted by the record/read head in accessing the magnetic disk 1 when recording and reading data to the latter. For example, the master disk 2 may be magnetized in a circular pattern of alternating N and S polarities extending in a direction from the center toward the outer radius.

Figure 6A:
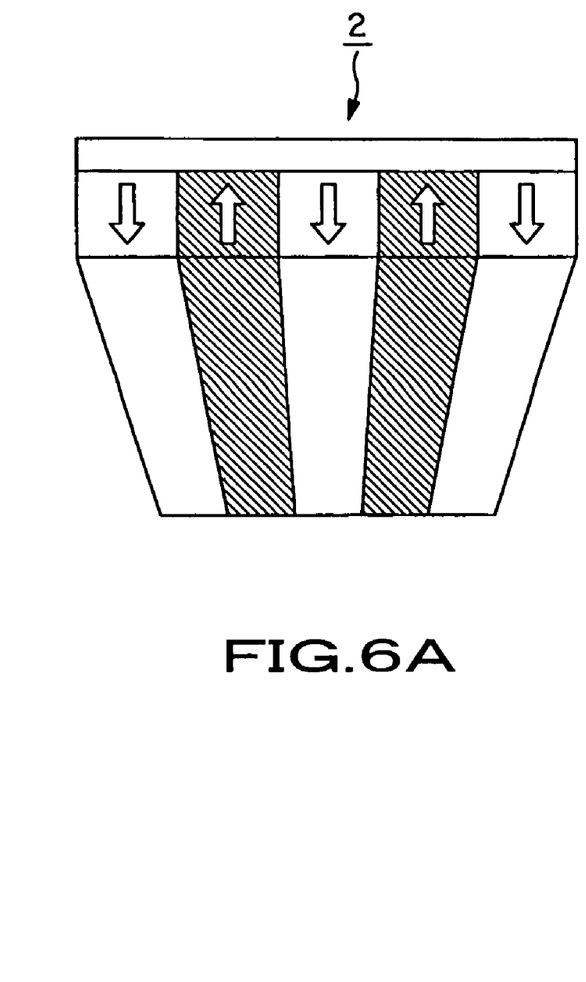
FIG. 6 shows the direction in which the master disk shown in FIG. 5 is magnetized.
Figure 6B:
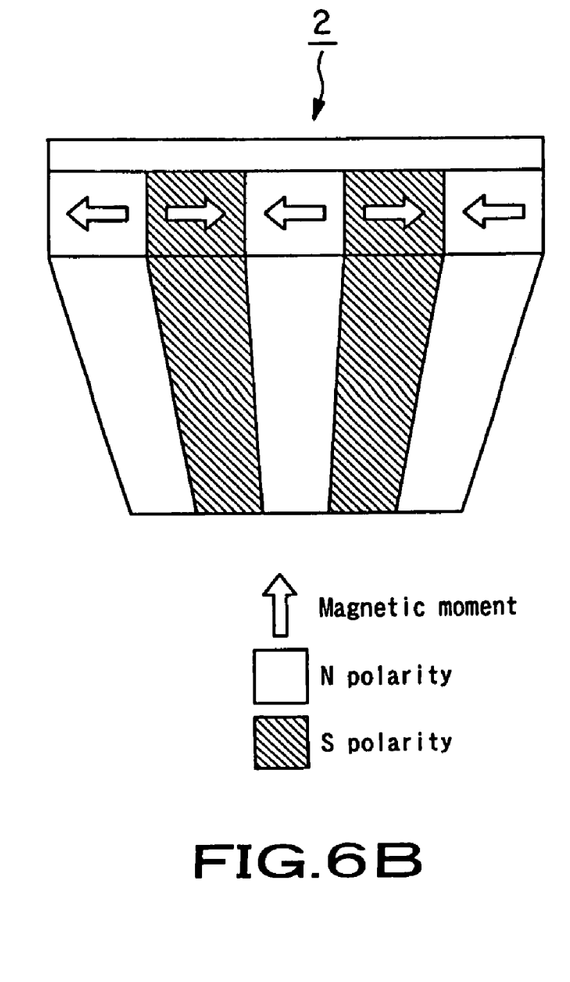

Also, the master disk 2 may be a vertical magnetic type (as shown in FIG. 6A) that can be magnetized with vertical magnetism or a horizontal magnetic type (as shown in FIG. 6B) that can be magnetized with horizontal magnetism, depending upon the property of a magnetic layer applied to the magnetic disk 1.

Figures 7A, 7B, 7C:
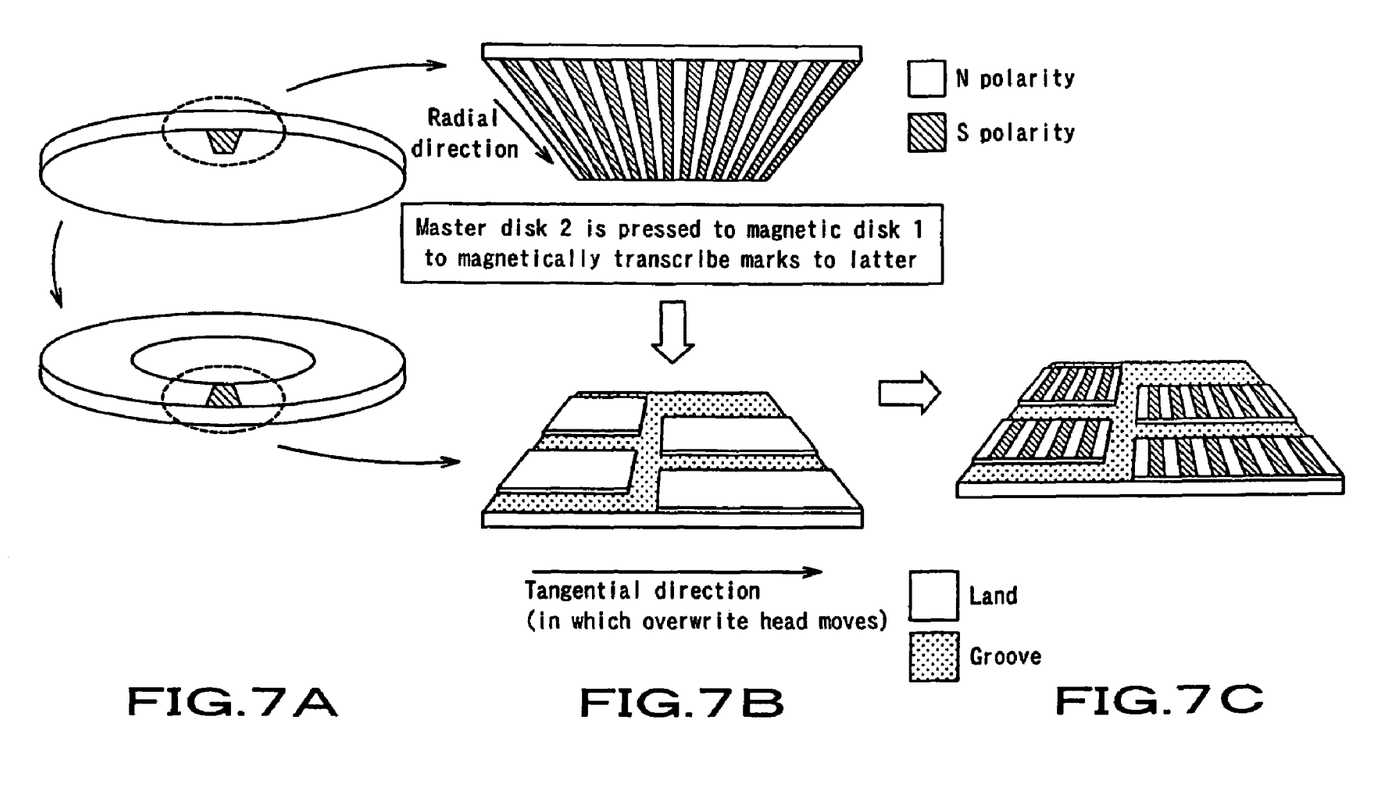
FIG. 7 explains how magnetic information in the master disk is magnetically transcribed to a magnetic disk.
Figure 8:
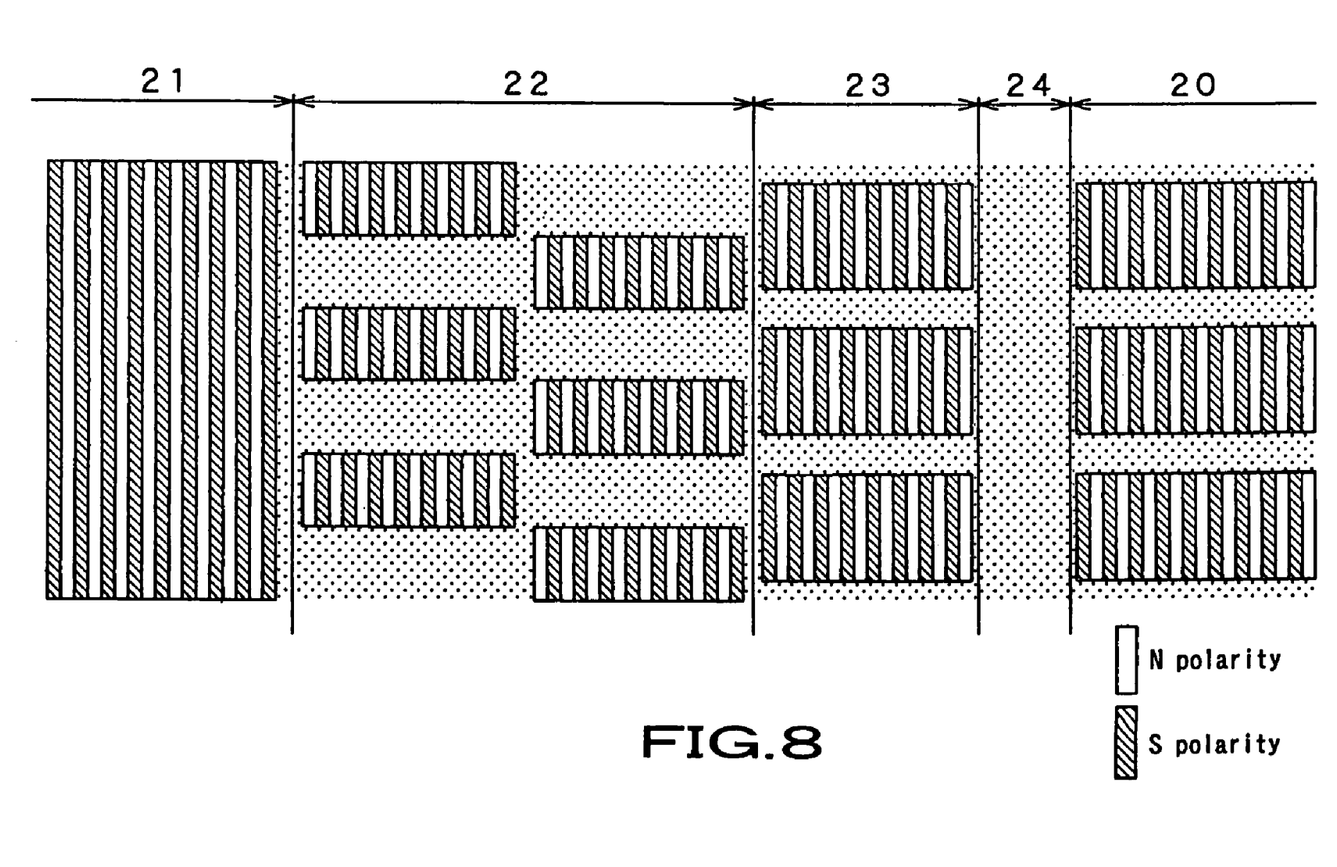
FIG. 8 is a view, enlarged in view, of a part of the magnetic disk to which the magnetic information has been transcribed by the method explained in FIG. 7.

The above-mentioned master disk 2 is superposed on the magnetic disk 1 as shown in FIG. 7. A magnetic signal, that is, a servo signal, is magnetically transcribed to the partitioned data/information recording area 20, address/ID area 21, PES area 22 and clock area 23, formed convex in the recording region 12 of the magnetic disk 1 having the master disk 2 superposed thereon (as shown in FIG. 8).

Using the method of transcribing magnetic information from the master disk 2 superposed on the magnetic disk 1 to the latter as if the information were printed to the magnetic disk 1 as above, the servo signal and clock signal can be recorded to the magnetic disk 1 simply in a short time.

Also note that to magnetically transcribe magnetic information to a conventional magnetic disk having no recess formed between adjacent recording tracks with the master disk being superposed on the magnetic disk, the magnetic pattern formed on the master disk has to be formed in detail on each recording track because the magnetically transcribed magnetic information is used as servo information and address information as it is.

On the other hand, to magnetically transcribe magnetic information to the magnetic disk 1 having the recess formed between adjacent recording tracks, the magnetic pattern formed on the master disk may be as simple as being able to form a repetition signal having a predetermined frequency.

Note that although the method of magnetically transcribing the magnetic information to the magnetic disk 1 from the master disk 2 superposed on the latter has been described above, the present invention is not limited only to this method but the magnetic information may magnetically be transcribed to the magnetic disk 1 by any other method which would be able to transcribe the magnetic information to the magnetic disk 1.

It should be understood by those skilled in the art that various modifications, combinations, sub-combinations and alterations may occur depending on design requirements and other factors insofar as they are within the scope the appended claims or the equivalents thereof.

The invention claimed is:

1. A method of producing a magnetic disk having a central hole, an outer radius, a plurality of annular recording tracks formed in a direction from the central hole toward the outer radius, each recording track including a plurality of sectors, and a recess formed between adjacent recording tracks to a predetermined depth, the method comprising:
    providing a magnetizing master disk magnetized in a predetermined pattern of alternating N and S polarities extending in a direction from a center of the master disk toward an outer radius thereof; and
    superposing the master disk on the magnetic disk to magnetically transcribe a magnetic signal to the recording tracks based on the predetermined pattern.

2. The method according to claim 1, wherein the master disk has a circular pattern of alternating N and S polarities extending in a direction from the center of the master disk toward the outer radius thereof.

* * * * *